June 12, 1928.
W. R. MITTENDORF
1,672,950
CHART FOR COUNTING AND COMPUTING SCALES
Filed June 26, 1922 2 Sheets-Sheet 1
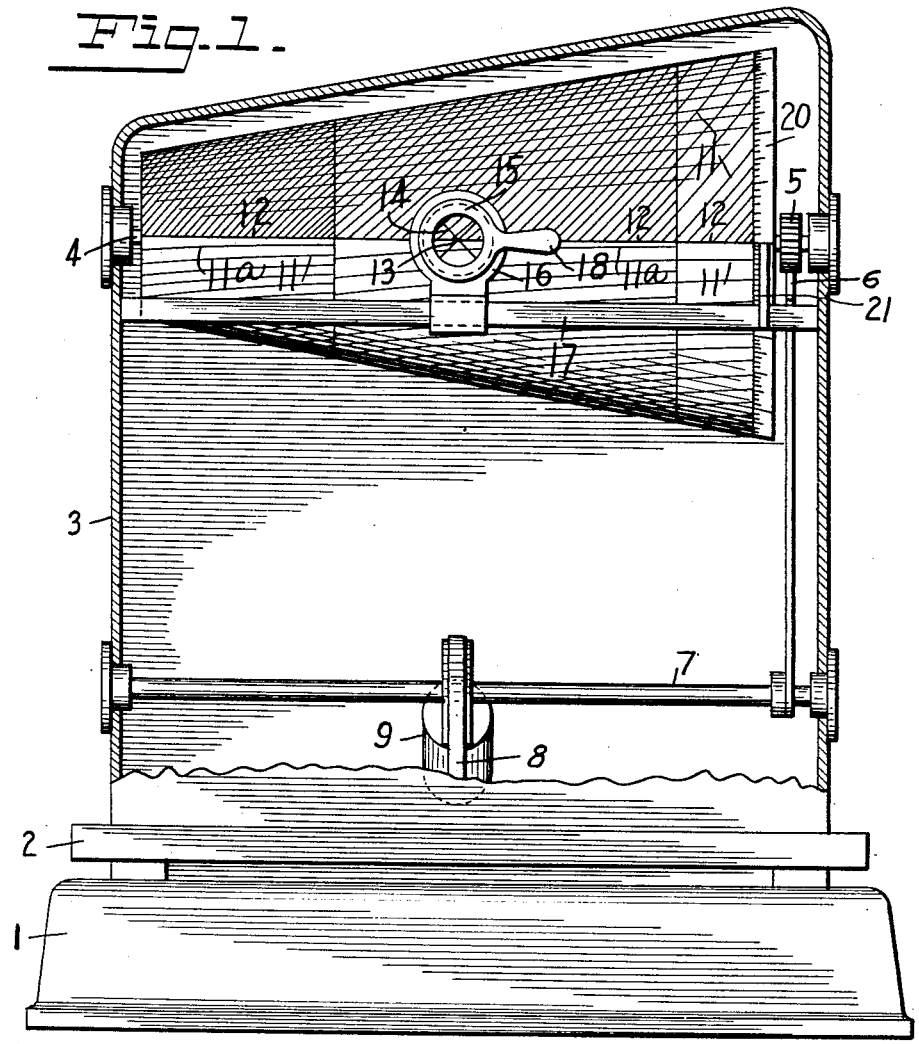
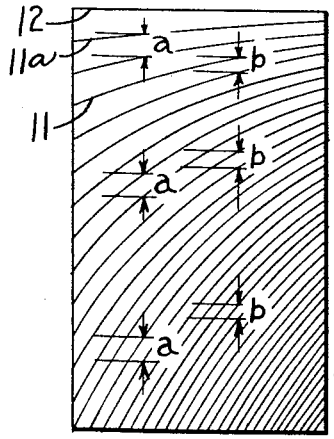
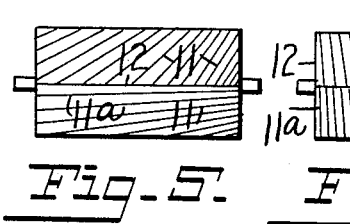
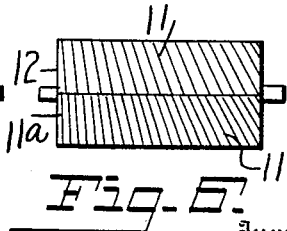
Inventor
WM. R. MITTENDORF.
Attorney June 12, 1928.
W. R. MITTENDORF
1,672,950
CHART FOR COUNTING AND COMPUTING SCALES
Filed June 26, 1922   2 Sheets-Sheet 2
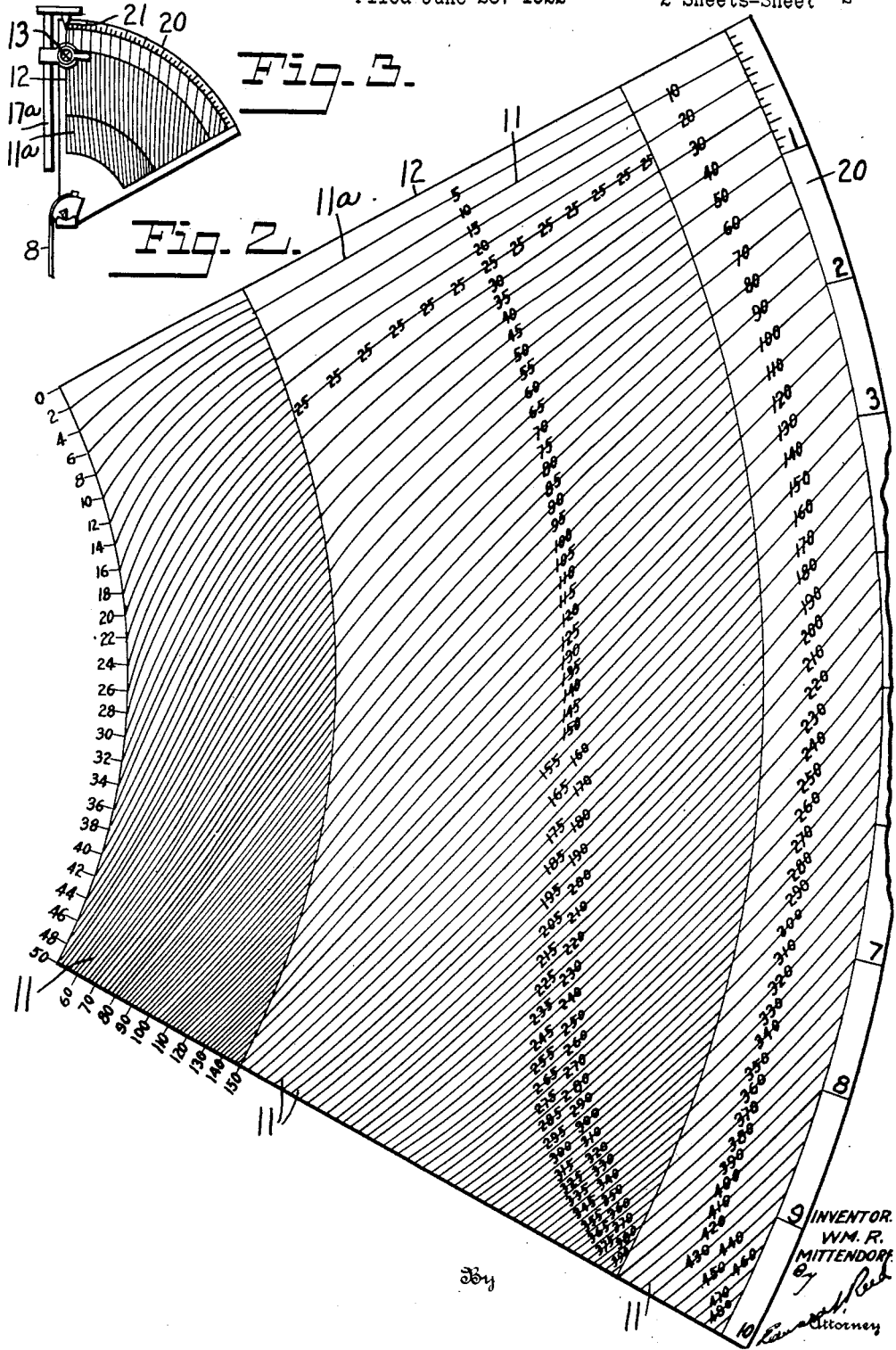

Patented June 12, 1928.

1,672,950

UNITED STATES PATENT OFFICE.

WILLIAM R. MITTENDORF, OF CINCINNATI, OHIO, ASSIGNOR, BY MESNE ASSIGNMENTS, TO THE WATSON EXPERIMENTAL LABORATORY COMPANY, OF DAYTON, OHIO, A CORPORATION OF OHIO.

CHART FOR COUNTING AND COMPUTING SCALES.

Application filed June 26, 1922. Serial No. 570,990.

This invention relates to new and useful improvements in charts for counting and computing scales and other calculating devices.

One object of the invention is to provide a chart which in itself is, and which permits the scale or other device to which it is applied to be, of a very simple construction, thereby requiring a minimum amount of mental and physical effort on the part of the operator.

Another object of the invention is to provide a chart, which, with only one series of lines, enables the operator to make counts or calculations from a unit of unlimited variety of size or amount within the capacity of the chart.

Another object of the invention is to provide a counting chart, which when applied to a weighing scale, can be associated with a weighing chart, thereby indicating at the same time the number of parts and the weight thereof.

Other objects of the invention will be described in the specification and particularly pointed out in the claims.

Referring to the accompanying drawings Fig. 1 is a front elevation, partially in section, of a scale provided with my improved counting chart; Fig. 2 is a view of a chart which, when flat, is in the form of a fan or portion of a segment, and which is adapted to be mounted as a frustum of a cone, as shown in Fig. 1; Fig. 3 is a view of the chart shown in Fig. 2 mounted in a plane and the instrumentalities used in connection therewith; Fig. 4 is a view of a chart in the form of a rectangle; Fig. 5 is a view of the chart shown in Fig. 4 when made up in the form of a cylinder with the base line parallel with the axis; and Fig. 6 is a similar view with the base line circumferential to the axis.

Referring to Fig. 1 of the drawings, 1 represents the base of a scale provided with a platform 2 and a standard 3. In the present instance there is mounted in the standard a shaft 4 which is connected with the lever mechanism (not shown) of the platform 2 by a pinion 5, a gear segment 6, a shaft 7 and strap 8, which is all of well known construction. I have also shown a pendulum 9. It is to be understood, however, that the invention may be applied to scales or computing devices of various kinds. The shaft 4 is adapted to support and rotate the chart the most practical form of which is believed to be fan shaped in the flat, but mounted in the shape of the frustum of a cone, as illustrated in Figs. 1 and 2. Theoretically, however, the chart in its simplest form is shaped as a rectangle, as shown in Fig. 4, which permits it to be mounted on the shaft 4 in the form of a cylinder, as is illustrated in Fig. 5. In Fig. 4 the chart consists of a series of angularly disposed curved lines 11 which diverge from a base or zero line 12 in a uniform manner. The lines 11 are equi-distant apart along imaginary or indicating lines perpendicular to the zero line. In Fig. 5 the zero line is mounted parallel with the axis of the cylinder or cone while in Fig. 6 the zero line is circumferential to the axis. The arrangement shown in Fig. 6 may be desirable in certain types of computing devices. It will be seen from Fig. 4 that all of the distances $a$—$a$ are equal to each other, which is also true of the distances $b$—$b$. The imaginary, or indicating, lines above referred to do not appear on the chart, but are used in reading the same, they being established by the position of an indicator 13, between which and the chart there is relative movement perpendicular to the zero, or base, line. The indicator 13 is not an essential element of the device as the indicating point may be established by the thumb nail of the operator, or by any suitable pointer. The indicator 13 of the present instance is formed by two cross hairs 14 mounted in a pivotally mounted frame 15, supported by a sliding frame 16 mounted on a bar 17 parallel with the zero line 11. When setting the indicator 13 the frame 16 is moved along the bar 17 until the intersection of the cross hairs at 14 registers with the primary diverging line 11ª. The diverging lines 11 are all numbered consecutively, or in consecutive multiples of a given digit, according to their value as established by their distance away from the base or zero line. It will be noted from Fig. 4 that in the rectangular or cylindrical form of chart the lines at one corner are contracted and approach the perpendicular too closely for practical purposes. To overcome this objection the chart is made fan shaped in the flat and is mounted in the form of a frustum of a cone, as is shown in Figs. 1 and 2. The side of the fan having the greatest width and the end of the cone frustum of larger diameter receives that portion of the chart in which the lines tend to be more concentrated. Where the lines are thus laid on a chart, the position of succeeding lines form exact multiples of the distance from the zero line to the primary diverging line along the indicating or imaginary lines. Consequently, when one or a few primary articles of a commodity, consisting of articles of uniform weight, are placed on the scale platform, thereby moving the chart relative to the indicator to an extent commensurate with the weight of the primary articles, and a perpendicular imaginary line has been established by moving the indicator until the intersection of the cross hairs 14 registers with the primary diverging line, the number of articles in a mass having a total weight less than the capacity of the scale, may be ascertained by placing the same on the platform. This placement will move the chart to an amount and position commensurate with the weight of the commodity. This amount of movement may be ascertained by noting the diverging line which registers with the intersection of the cross hairs 14 in the indicator 13. In other words, the relative movement between the chart and indicator establishes the number of articles where the relative movement caused by a primary known number is compared with the calibrated movement caused by an unknown number. It is believed that it is not desirable, or necessary for practical purposes, to extend all of the lines entirely across the chart, but that certain lines can to advantage be made to extend only part way across the chart. This arrangement forms zones which requires using a certain number of articles to make up the unit when establishing the position of the indicator within any certain zone. Thus, if the articles to be counted are so small that it requires ten of them to equal one graduation, then, of course, the indicator would be positioned somewhere within the zone wherein each graduation represents ten articles. In the present instance it is found convenient to use zones for two, five and ten primary articles. The "two" zone is used for the heaviest articles, while the "ten" zone for the lightest; and it is to be noted that the "ten" zone is capable of indicating the greatest number of articles.

As before stated, the indicator 13, formed by the cross hairs 14, is mounted in a frame 15. The frame 15 is pivotally mounted in the frame 16 and is provided with a handle 18 by means of which the hairs 14 can be adjusted to permit the intersection of the hairs to register with the lines 11 to the best advantage, it being seen from the chart that the lines lie at various angles. This mounting eliminates the possibility of one of the hairs 14 lying parallel with one of the lines 11, whereby the indicating point or intersection could not be placed in distinct registration with a definite point on the line.

If it should happen that the number of articles in a commodity was not a multiple of any of the divisions of the chart, which would bring the indicating point 13 between two of the lines 11, the operator removes from the platform a sufficient number of articles to bring the indicator and line into registration. This number is subsequently added to the number of the line on which the indicator registers, thereby giving the total number of articles.

In Fig. 3, the chart shown in Fig. 2 is retained in its fan shape and is mounted to rotate about the apex of the fan or the center of the circle of the segment of which the fan is a part. This rotation is accomplished by connection with the scale platform in any well known manner. The indicator is of the same design as the one previously described and is slidably mounted on a stationary vertical bar 17$^a$ for positioning.

It will be seen that as the chart, when applied to a scale, moves to an extent commensurate with the weight of the articles, the chart may be provided with a weighing index 20 which cooperates with an indicator 21, thereby permitting the operator to ascertain the weight and the number of the articles at the same time.

While I have shown and described one embodiment of my invention I wish it to be understood that I do not desire to be limited to the details thereof as various modifications may occur to a person skilled in the art.

Having now fully described my invention what I claim as new and desire by Letters Patent is:

1. In a counting machine, a chart comprising a plurality of lines which are curved to cause the same to diverge one from the other and which are equidistant apart along parallel imaginary lines, and a rotatably adjustable indicator provided with cross hairs and mounted for movement across the face of said chart.

2. In a counting machine, a chart comprising a base line and a series of lines extending lengthwise of said base line and which are curved to cause the same to diverge one from the other and from said base line, said lines being equally spaced along indicating lines perpendicular to the base line, and a rotatably adjustable indicator provided with cross hairs and mounted for bodily movement across the face of said chart and normally stationary with relation thereto.

3. A movable chart for a calculating device comprising a plurality of lines which are curved to cause the same to diverge one from the other and which are equidistant apart along parallel imaginary lines, and which move transversely past an indicating point when movement is imparted to said chart.

4. A movable chart for a calculating device, comprising a base line and a series of lines extending lengthwise of said base line and which are curved to cause the same to diverge one from the other and from said base line, said lines being equidistant apart along indicating lines perpendicularly to the base line.

5. A movable chart for a calculating device comprising a base line and a series of lines extending lengthwise of said base line and which are curved to cause the same to diverge one from the other and from said base line, said lines being equally spaced along indicating lines perpendicularly to the base line, and a series of intermediate lines similarly curved and placed and extending partially across said chart.

6. A movable chart for a calculating device comprising a base line and a series of unbroken lines, each line of said series being spaced from said base line throughout its length and angularly disposed relative thereto according to its significance along imaginary lines perpendicularly to said base line, the significance of each line of said series being different at each imaginary line and the disposition of each of said lines being such as to avoid a conjunction with any other line of said series or with said base line irrespective of the distance said lines may be projected.

7. A chart for a calculating device comprising a plurality of lines which are curved to cause the same to diverge one from the other and which are equidistant apart along parallel imaginary lines.

8. A chart for a calculating device which, when flat in form, comprises a plurality of curved lines which are equidistant apart along parallel imaginary lines.

9. A chart for a calculating device comprising a plurality of diverging lines each following a path greater in length than the shortest distance between the ends thereof on the surface of said chart, said lines being equidistant apart along parallel imaginary lines.

10. A chart for a calculating device comprising a straight base line extending lengthwise thereof, and a series of computing lines extending lengthwise of said chart, spaced from said base line and from each other at one end of said chart, and diverging from said base line toward the other end of said chart.

11. A chart for a calculating device comprising a straight base line extending lengthwise thereof, a series of computing lines extending lengthwise of said chart and spaced from said base line and from each other at one end of said chart and curved from said base line toward the other end of said chart.

12. A chart for a calculating device comprising a base line, unbroken curved diverging lines equally spaced along indicating lines perpendicular to the base line, said chart being fan-shaped when flat but mounted in the form of a frustum of a cone.

In testimony whereof, I affix my signature hereto.

WILLIAM R. MITTENDORF.